(12) United States Patent
Witter et al.

(10) Patent No.: US 7,548,826 B2
(45) Date of Patent: Jun. 16, 2009

(54) POWER MONITORING AND TESTING

(75) Inventors: Bradley Jay Witter, Alpharetta, GA (US); Thomas Joseph Butler, Alpharetta, GA (US)

(73) Assignee: Blue Pillar, Inc., Alpharetta, GA (US)

(*) Notice: Subject to any disclaimer, the term of this patent is extended or adjusted under 35 U.S.C. 154(b) by 35 days.

(21) Appl. No.: 11/556,496

(22) Filed: Nov. 3, 2006

(65) Prior Publication Data

US 2008/0052027 A1 Feb. 28, 2008

Related U.S. Application Data

(60) Provisional application No. 60/823,474, filed on Aug. 24, 2006.

(51) Int. Cl.
*G06F 19/00* (2006.01)
(52) U.S. Cl. .......................... 702/115; 702/61; 702/106; 702/188; 700/22; 700/286; 700/295; 340/995.1; 324/140; 324/113; 705/1; 705/14; 705/40
(58) Field of Classification Search ................ 702/62, 702/57, 60, 189, 115, 127, 106, 58, 61, 108, 702/188, 182; 700/22, 286, 295, 291, 296; 340/995.1; 324/140, 113; 705/1, 14, 40
See application file for complete search history.

(56) References Cited

U.S. PATENT DOCUMENTS

| | | | |
|---|---|---|---|
| 5,572,438 A | 11/1996 | Ehlers et al. | |
| 5,862,391 A | 1/1999 | Salas et al. | |
| 6,058,355 A | 5/2000 | Ahmed et al. | |
| 6,097,108 A | 8/2000 | Tweed | |
| 6,181,028 B1 | 1/2001 | Kern et al. | |
| 6,519,003 B1* | 2/2003 | Swayze | 348/375 |
| 6,542,856 B2 | 4/2003 | Frantz et al. | |
| 6,587,355 B2 | 7/2003 | Park et al. | |
| 6,591,296 B1 | 7/2003 | Ghanime | |
| 7,072,801 B2* | 7/2006 | James | 702/188 |
| 7,231,280 B2* | 6/2007 | Costa | 700/286 |
| 2006/0028336 A1* | 2/2006 | Glenn et al. | 340/531 |
| 2006/0208927 A1* | 9/2006 | Poor et al. | 340/995.1 |

* cited by examiner

*Primary Examiner*—Carol S Tsai
(74) *Attorney, Agent, or Firm*—Morris, Manning & Martin LLP

(57) ABSTRACT

Systems and methods for monitoring, managing, and testing power systems are disclosed. In various embodiments, a site server collects data from one or more generators, automatic transfer switches, sensors, and cameras at a site. The site server stores captured data and triggers alarm events when preselected limits are exceeded. The site server also enables users to configure, initiate, pause, resume, monitor, and abort scripted tests of the monitored entities. In some of these and other embodiments, an enterprise-wide server collects data from multiple site servers, makes the data available via a web-based or other client interface, and provides consolidated monitoring, alarm, test management, and management resources.

7 Claims, 14 Drawing Sheets

FIG. 10

| | LIVE VIEW | TESTING | REPORTING | ALARMS | ADMIN |
|---|---|---|---|---|---|

DEFINE TESTS    SCHEDULE / STATUS

ACTIVE TEST STATUS

| DESC. | TEST | START | ELAPSED (MIN) | STEP # | STATUS | ENTITY |
|---|---|---|---|---|---|---|
| TS3 | GEN1_GEN2_TEST | 7/5/2006 1:24:00PM | 00:04 | 1 | ACTIVE | GENERATOR1 |

TEST SCHEDULING / DETAIL

JULY 2006

| SUNDAY | MONDAY | TUESDAY | WEDNESDAY | THURSDAY | FRIDAY | SATURDAY |
|---|---|---|---|---|---|---|
| 25<br>TEST 3:27 PM | 26<br>TEST 1:37 PM<br>TEST 1:50 PM | 27<br>DFG 9:56 AM<br>TEST5 10:53AM<br>T 11:01 AM | 28<br>TEST 1:24 PM | 29<br>TEST 3:26 PM | 30<br>TEST 8:21 PM | 1 |
| 2 | 3<br>TEST 1:3:00PM<br>TEST 2 4:42PM | 4<br>TEST 2:22PM<br>TEST 2 3:27PM<br>TEST 3 3:39PM | 5<br>TEST 8:13 AM<br>T2 12:45 PM<br>T3 12:52 PM<br>T5 1:17 PM<br>TS3 1:24 PM | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | 1 | 2 | 3 | 4 | 5 |

570
572
574

EMERGENCY POWER SUPPLY SYSTEM TEST REPORT - GENERATOR 2

TEST REPORT FOR TEST PERFORMED AT 7/5/2006 1:19:01 PM

| | TIME | DC VOLTAGE | ENGINE SPEED | EXHAUST TEMPERATURE | FREQUENCY | FUEL LEVEL | HOUR METER |
|---|---|---|---|---|---|---|---|
| START - 1MIN | 1:20:01 PM | 17.17 | 17.17 | 17.17 | 17.17 | 17.17 | 17.17 |
| 1/2 | 1:19:31 PM | 11.76 | 11.76 | 11.76 | 11.76 | 11.76 | 11.76 |
| END | 1:20:01 PM | 17.17 | 17.17 | 17.17 | 17.17 | 17.17 | 17.17 |

ALARM MANAGEMENT

LIVE VIEW    TESTING    REPORTING    ALARMS    ADMIN

ACK ALL | REAL TIME | HISTORY

| DATE TIME | TEXT | TYPE | ALARM VALUE |
|---|---|---|---|
| 7/5/2006 1:24:07 PM | COUNTY_GENERAL_MAIN_GENERATOR_3_WATER TEMPERATURE HI ALARM | HIGH | 30.2001550793646 |
| 7/5/2006 12:41:33 PM | COUNTY_GENERAL_MAIN_GENERATOR_3_STATUS ALARM | DIGITAL | 1 |
| 7/4/2006 2:46:14 PM | ALARM LOGGING GROUP COUNTY GENERAL_MAIN_NEW ENTITY COMMUNICATION TO NETWORK NODE LOCALHOST FAILURE | SYSTEM | 0 |
| 7/4/2006 2:46:14 PM | ALARM LOGGING GROUP LOVE HOSPITAL EPSS1_NEW TEST COMMUNICATION TO NETWORK NODE LOCALHOST FAILURE | SYSTEM | 0 |
| 7/4/2006 2:46:14 PM | ALARM LOGGING GROUP COUNTY GENERAL_MAIN_ATS1_ COMMUNICATION TO NETWORK NODE LOCALHOST FAILURE | SYSTEM | 0 |
| 7/4/2006 2:46:14 PM | ALARM LOGGING GROUP COUNTY GENERAL_MAIN_UTILITY SERVICE COMMUNICATION TO NETWORK NODE LOCALHOST FAILURE | SYSTEM | 0 |
| 7/4/2006 2:46:14 PM | ALARM LOGGING GROUP COUNTY GENERAL_MAIN_GEN 2 ATS - GEN 2 COMMUNICATION TO NETWORK NODE LOCALHOST FAILURE | SYSTEM | 0 |
| 7/4/2006 2:46:14 PM | ALARM LOGGING GROUP COUNTY GENERAL_MAIN_GEN 1 ATS - GEN 1 COMMUNICATION TO NETWORK NODE LOCALHOST FAILURE | SYSTEM | 0 |
| 7/4/2006 2:46:14 PM | ALARM LOGGING GROUP COUNTY GENERAL_MAIN_GDP COMMUNICATION TO NETWORK NODE LOCALHOST FAILURE | SYSTEM | 0 |
| 7/4/2006 2:46:14 PM | ALARM LOGGING GROUP COUNTY GENERAL_MAIN_GENERATOR 2 COMMUNICATION TO NETWORK NODE LOCALHOST FAILURE | SYSTEM | 0 |

POWER MONITORING AND TESTING

RELATED APPLICATIONS

This application claims priority to U.S. Provisional Patent Application 60/823,474, filed Aug. 24, 2006, entitled "TEST AND MONITORING SYSTEM".

FIELD

The present disclosure relates to monitoring, management, and testing of power systems.

BRIEF DESCRIPTION OF THE DRAWINGS

FIG. 10 is an example screen in the month-level test schedule/status interface of the fifth embodiment.

FIG. 11 is an example report from a test in the fifth embodiment.

FIG. 13 is an example screen of the alarm management interface of the fifth embodiment.

DESCRIPTION

Figure 1:
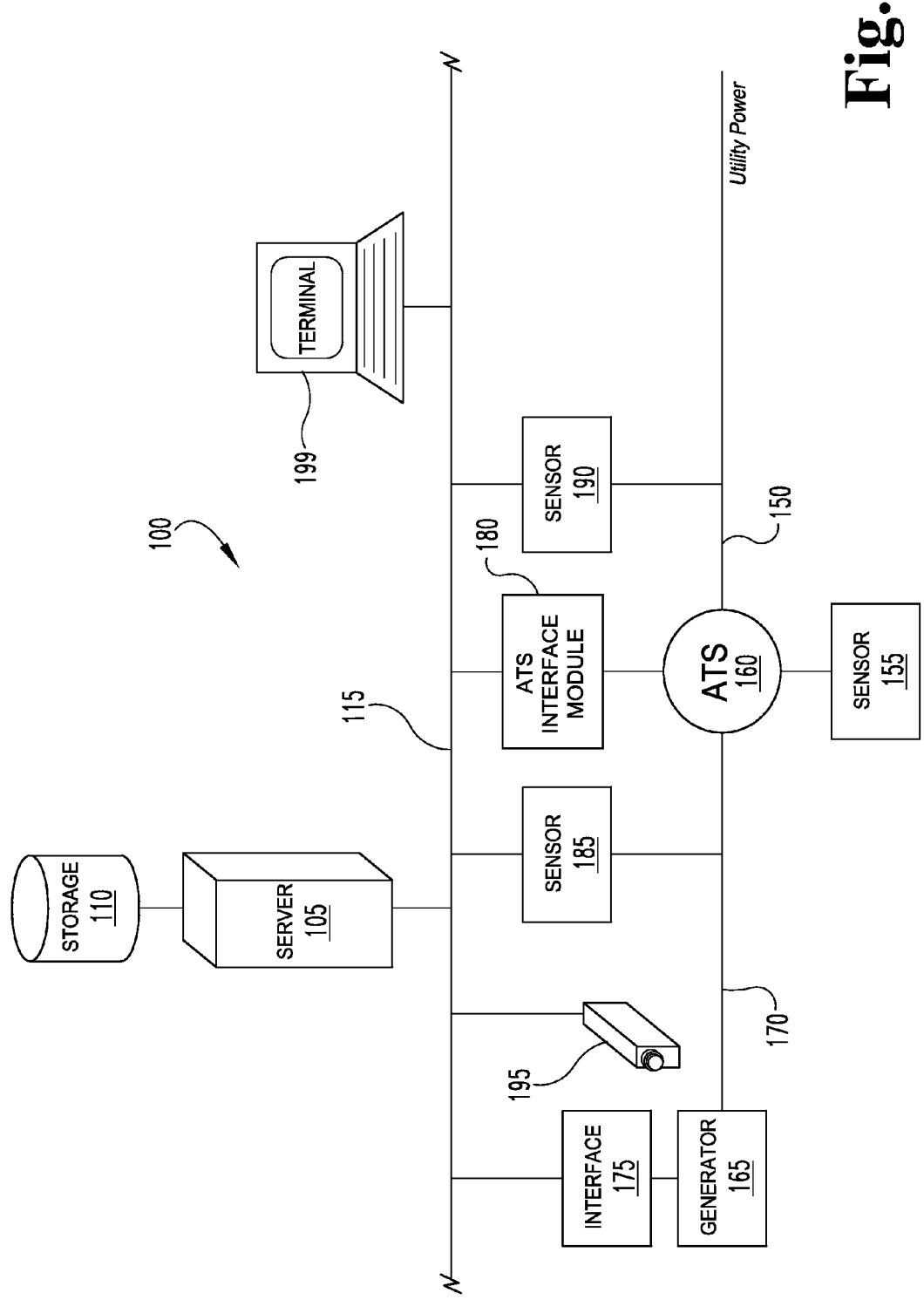
FIG. 1 is a block diagram showing portions of a site's power generation, monitoring, management, and testing system according to one embodiment.

For the purpose of promoting an understanding of the principles of the present invention, reference will now be made to the embodiments illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Figure 2:
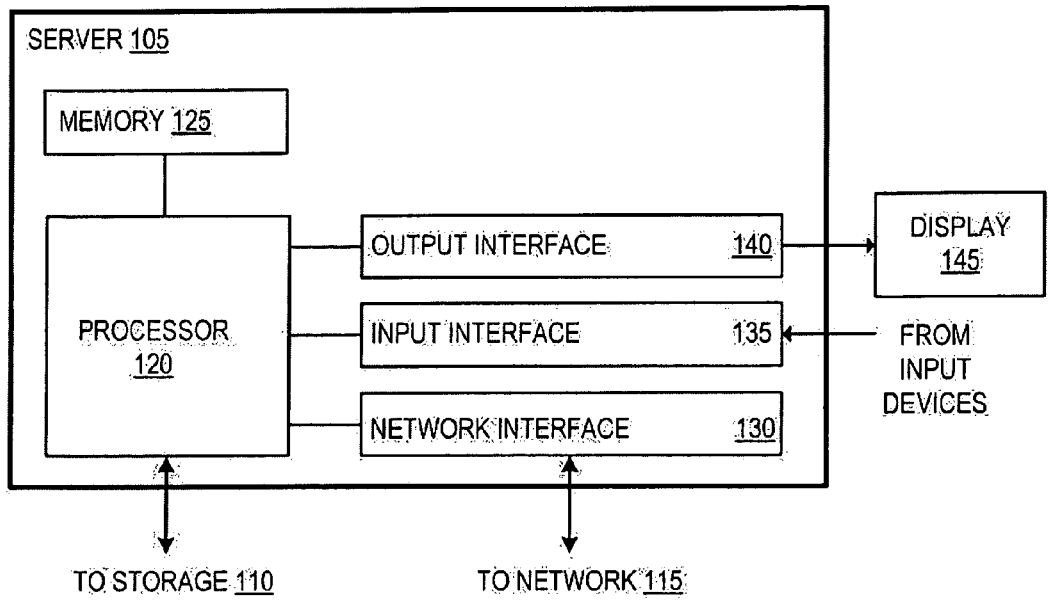
FIG. 2 is a block diagram of a server according to the first embodiment.

Generally, one form of the present invention is a system for monitoring, managing, and testing a power system having local generators and connections to the utility power grid. Turning to FIG. 1, a system 100 is shown with a server 105 and storage 110 connected to data network 115. Server 105 in this embodiment includes processor 120, memory 125, network interface 130, input interface 135, and output interface 140, as shown in FIG. 2 and as will be understood by those skilled in the art. Power, ground, clock, and other signals and circuitry are omitted for clarity, but will be understood and easily implemented by those skilled in the art.

With continuing reference to FIG. 2, network interface 130 in this embodiment connects server 105 to network 115 for communication of data between server 105 and other devices attached to network 115. Input interface 135 manages communication between processor 120 and one or more pushbuttons, UARTs, IR and/or RF receivers or transceivers, decoders, or other devices, as well as traditional keyboard and mouse devices. Output interface 140 provides a video signal to display 145, and may provide signals to one or more additional output devices such as LEDs, LCDs, or audio output devices, or a combination of these and other output devices and techniques as will occur to those skilled in the art.

Processor 120 in some embodiments is a microcontroller or general purpose microprocessor that reads its program from memory 125. Processor 120 may be comprised of one or more components configured as a single unit. Alternatively, when of a multi-component form, processor 120 may have one or more components located remotely relative to the others. One or more components of processor 120 may be of the electronic variety including digital circuitry, analog circuitry, or both. In one embodiment, processor 120 is of a conventional, integrated circuit microprocessor arrangement, such as one or more PENTIUM 4 or XEON processors from INTEL Corporation of 2200 Mission College Boulevard, Santa Clara, Calif. 95052, USA, or ATHLON XP or OPTERON processors from Advanced Micro Devices, One AMD Place, Sunnyvale, Calif. 94088, USA. In alternative embodiments, one or more application-specific integrated circuits (ASICs), general-purpose microprocessors, programmable logic arrays, or other devices may be used alone or in combination as will occur to those skilled in the art.

Likewise, memory 125 in various embodiments includes one or more types such as solid-state electronic memory, magnetic memory, or optical memory, just to name a few. By way of non-limiting example, memory 125 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge media; or a combination of these memory types. Also, memory 125 is volatile, nonvolatile, or a hybrid combination of volatile and nonvolatile varieties.

Returning to FIG. 1, utility power line 150 provides power to load 155 via Automatic Transfer Switch (ATS) 160. When utility power delivered through line 150 is unstable or insufficient, ATS 160 manages a partial or total switchover to power generated by generator 165 and delivered through line 170. In various embodiments, ATS 160 is an automatic transfer switch manufactured by APC (such as its Rack ATS product), Cummins (such as its POWER COMMAND transfer switches), BayTech (such as its ATS Series Transfer Switch), or Caterpillar, just to name a few options. Similarly, generator 165 is selected, in various embodiments, from the Caterpillar C175 family, Cummins generator sets, and other models which will occur to those skilled in the art. In some instances, generator 165 and ATS 160 are integrated in a single unit, while in others the units are distinct.

In various embodiments, generator 165 includes a built-in interface 175, which may be used in its factory configuration or supplemented with additional interface hardware and/or software to provide the interface used by system 100. In other embodiments, generator 165 includes only a limited number of built-in sensors (or none at all), and interface 175 must provide all or substantially all of the instrumentation for that generator 165.

In some embodiments, generator 165 is connected to genset interface module 175, which collects operational parameters from generator 165 and makes them available to other devices via network 115. In various embodiments, the parameters provided by genset interface module 175 includes the genset's fuel level, oil pressure, "running" status, water temperature, exhaust temperature, output frequency, engine speed, applied torque, DC output voltage, and running time meter, just to name a few.

ATS interface module 180 detects the state of ATS 160 and makes that information available via network 115 to other devices connected to the network. The data made available by ATS interface module 180 includes, in various embodiments, its running status, input level, override status, voltage, current, power output, power factor, and the like. In some embodiments, some or all of these variables are captured and made available via network 115 by one or more power meters (not shown) connected to or near the ATS.

Sensors 185 and 190 detect the state of supply lines 170 and 150, respectively, on the generator and utility inputs, respectively, to ATS 160. This data is also provided via network 115 to other devices that are connected to network 115. Camera 195 captures images of generator 165 over time so that devices connected to network 115 and capture and/or display still pictures or motion video of the physical site of generator 165 at desired times. In various embodiments, multiple cameras provide images in a variety of views and/or spectra as necessary or desired. Terminal 199 is also in communication with network 115 and is configured to monitor and/or control other devices on network 115.

Further, in various embodiments, multiple transfer switches 160, generators 165, sensors 185, 190, cameras 195, and interface modules 175, 180 are in communication with network 115 to implement and instrument a system that meets the power needs of a building, organization, institution, or group. Multiple terminals 199 communicate with server 105 to access data compiled or calculated there, or communicate with other devices and interfaces to read operational parameters or control those devices.

Server 105 collects data produced by interface modules 175 and 180, sensors 185 and 190, and camera 195, storing some or all of that data in storage unit 110. The data may be stored using any technique that would occur to one skilled in the art, including but not limited to, storing all such data, sampling the data at various intervals for longer-term storage, implementing circular buffers and snapshots, and other strategies. Server 105 also calculates aggregate information, such as uptime and running time for a device, maxima and minima of operational parameters over time, and the like, and constructs graphical depictions of captured data either on a scheduled, "snapshot" basis or on demand. Terminal 199 accesses the data on server 105 and (through server 105) in storage 110 so that an individual at terminal 199 can monitor and/or control ATS 160, generator 165, and/or other controllable devices using that information. In various embodiments, server 105 makes this data available in various forms, such as via FTP, HTTP, automatically generated email, or the like. In some embodiments, the data provided to terminal 199 is substantially real-time information, while in others served data is drawn from a snapshot of the relevant device(s), while in still others some data of each type is available.

Figure 3:
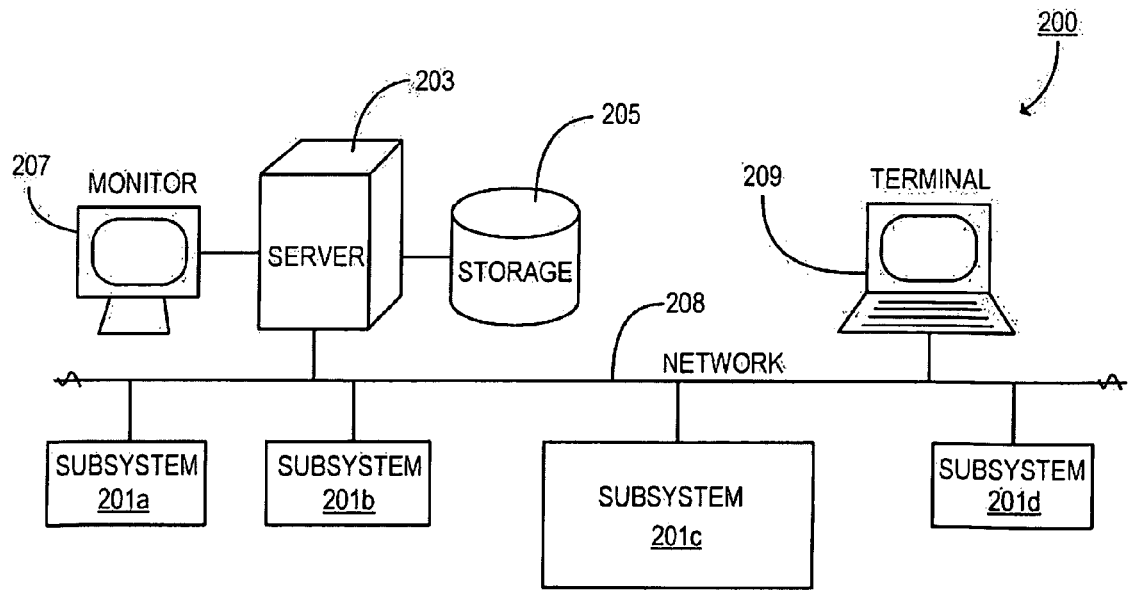
FIG. 3 is a block diagram showing portions of an enterprise's power generation, monitoring, management, and testing system according to a second embodiment.

FIG. 3 shows a system 200 that includes multiple subsystems 201a, 201b, 201c, and 201d. Each subsystem roughly resembles system 100 as shown in FIG. 1 and discussed in relation thereto, though the various subsystems may be in a single geographical location or multiple locations, could include the same or different numbers of generators 165, ATS units 160, sensors 185, 190, cameras 195, and other components, and may include elements that are the same or different in make, model, and/or configuration from those in other subsystems. Server 203 collects operational parameter information from a server 105 from each subsystem 201a, 201b, 201c, and 201d, compiles that information, and saves it in storage 205. Enterprise server 203 also calculates aggregate data and generates graphical displays for showing on monitor 207 and/or terminal 209.

Communication between subsystems 201, server 203, and terminal 209 occurs via one or more networks 208. In various embodiments, network 208 (and network 115 in FIG. 1) comprises one or more local area networks (LANs), wide area networks (WANs), virtual private networks (VPNs), dedicated communication circuits, device-level (e.g., Modbus) networks, and the like. One or more routers, switches, subnetworks, bridges, and the Internet may appear in networks 115 or 208, or between two or more portions of systems 100 and 200, as will occur to those skilled in the art.

Figure 4:
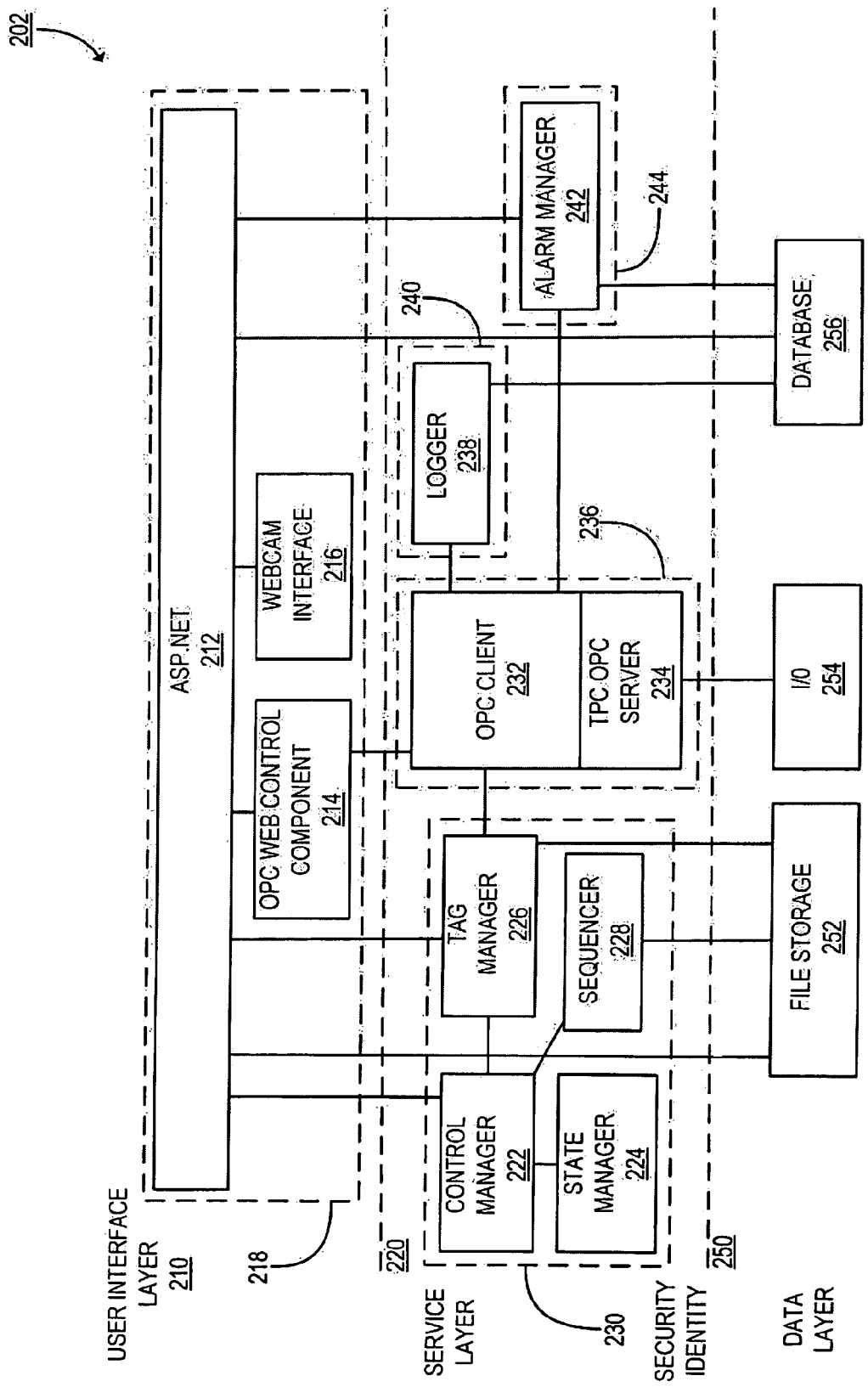
FIG. 4 is a block diagram of software entities, modules, and the like, including call flows and security identities in a third embodiment.

Software implementing functionality at server 105 (see FIG. 1) in one embodiment is shown in a block diagram in FIG. 4. In this embodiment, a memory 125 (see FIG. 2) is encoded with programming instructions executable by a processor 120 (again, see FIG. 2) to implement software system 202, which includes user interface layer 210, service layer 220, and data layer 250. User interface layer 210 manages user interactions with other parts of the software system 202, including communication of information captured by the system to one or more users. Service layer 220 manages the business logic and data flow in the system, while data layer 250 manages storage of captured data and configuration information for various system elements and in various repositories.

In this embodiment, user interface layer 210 includes ASP-.NET client component 212, which provides a variety of user-interface resources as will be understood in the art. OPC web control component 214 provides human-machine interface (HMI) components to ASP.NET client 212 for AJAX-style presentation of data and capture of user control events. Webcam interface 216 accepts a stream of images from a camera 195 (see FIG. 1) and provides data to ASP.NET client 212 for display as needed. Each of the components in user interface layer 210 is associated with a common security identity 218 in its interaction with components in service layer 220 and data layer 250.

Service layer 220 comprises several elements that manage data flow and implement business logic in the system. Control manager 222 detects and executes logging events, starts and stops locally connected controllable entities, starts and manages the system configuration state, management of software licensing, and detection of alarm events for notifications (by e-mail, for example). Control manager 222 communicates with ASP.NET client 212, which interacts with the state manager 224, tag manager 226, and sequencer 228 to implement a state machine that controls operation of the server, maintains session states, and provides new states based on input and programmed transitions. Tag manager 226 maintains a repository of information about the tags that are available to manage devices through the underlying OPC client 232, and loads the relevant tag configuration information at system startup, including configuration and device data, data logging configuration, and alarm logging configuration. Meanwhile sequencer 228 manages automated testing of devices according to schedules and commands executed by the system. These four components 222, 224, 226, and 228 share security identity 230 in their interaction with ASP.NET client 212, OPC client 232 and file storage 252.

OPC client 232 accesses data via Modbus TCP OPC server 234, which in this embodiment captures data from network 115 via I/O block 254. In this embodiment, OPC server 234 is published by Kepware (www.kepware.com), though any industry standards-compliant or other suitable OPC server may be used. OPC ("OLE for Process Control," a Distributed Common Object Model (DCOM) technology) client 232 and OPC server 234 share security identity 236 in their interaction with OPC web controls component 214, tag manager component 226, logger 238, and I/O subsystem 254.

Logger component 238 maintains data captured via OPC client 232 in database 256 using techniques that will occur to those skilled in the art. In some embodiments, logger component 238 also stores software events, queries issued, data pulley and capture events, and the like. Logger 238 has its own security identity 240 to authenticate and in some embodiments encrypt some or all of these interactions with OPC client 232 and database 256.

Similarly, alarm manager 242 monitors the stream(s) of data that flow through OPC client 232, checking them against limits defined by the system and/or users as discussed elsewhere herein. When such limits are exceeded, predetermined acts are taken, such as recording the event in database 256, raising alerts in the user interface via ASP.NET client 212, sending email or pages, or raising visible and/or audible alarms, to name just a new possibilities. Alarm manager 242 also has its own security identity 244 to authenticate and secure its interactions, as appropriate, with OPC client 232, ASP.NET client 212, and database 256.

Data layer 250 in this embodiment comprises file storage element(s) 252, I/O controllers and devices 254, and database 256. File storage 252 comprises one or more elements as described above in relation to storage element 110 of FIG. 1, and provides read/write storage for various elements of the system, including ASP.NET client 212, tag manager 226 and sequencer 228. As will be understood by those skilled in the art, file storage 252 can be monolithic or distributed, homogeneous or heterogeneous, or have parts of each type as needed or desired for a particular system.

Input/output block 254 provides the interface between server 105 and network 115, so that data streams can be captured and devices on network 115 can be controlled, and data can be shared with web-based terminals and enterprise-level servers. In various embodiments, I/O interface 254 comprises one or more network interface cards (NICs); Modbus interface hardware; other standard, custom, or proprietary data interfaces, or some combination thereof.

Database block 256 conceptually represents one or more databases, which could take on any of many forms that will occur to those skilled in the art. As some examples, database 256 may comprise one or more logical databases, may be monolithic or distributed, may be housed in volatile memory, nonvolatile hard drives, or optical media, and may be of the relational, object-relational, flat, hierarchical, network, object-oriented, semistructured, associative, entity-attribute-value, or context models, to name several examples. In fact, database 256 in some embodiments is hosted on server 105 and stored in storage 110 (see FIG. 1), though in other embodiments the host and/or storage is located elsewhere, or in a combination of local and remote locations.

In various embodiments, the "security identities" described herein provide distinct entities for control and monitoring of data access. For example, these identities in some embodiments are used to limit data available to software entities bearing particular identities, authenticate transfers of data between software entities, and/or provide public-key encryption keys for encrypted transfer of data between entities. Other applications of security identities in the context of this description will occur to those skilled in the art.

Figure 5:
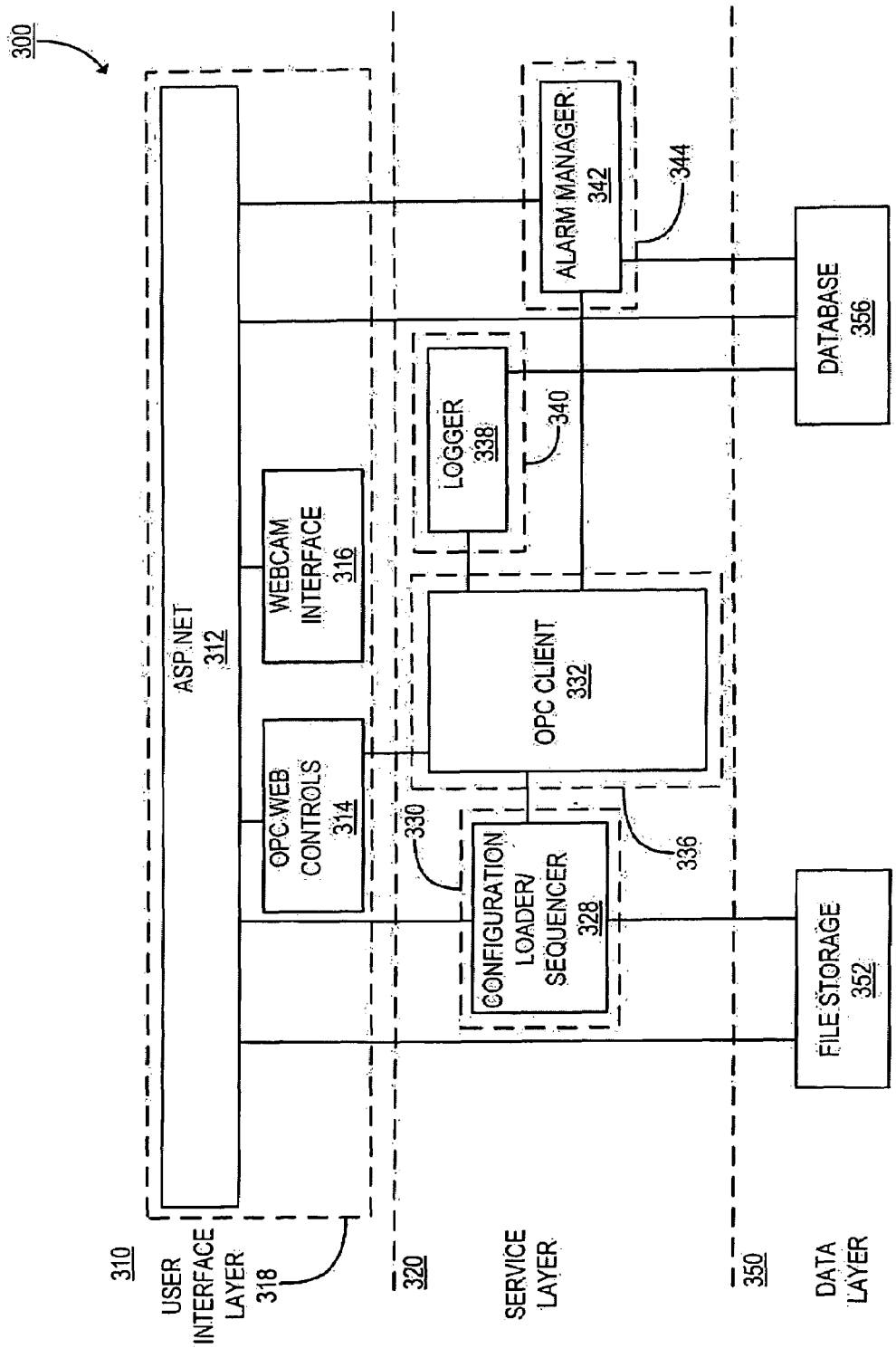
FIG. 5 is a block diagram of enterprise-wide server software system entities, modules, and the like, including call flows and security identities, according to a fourth embodiment.
Figure 6:
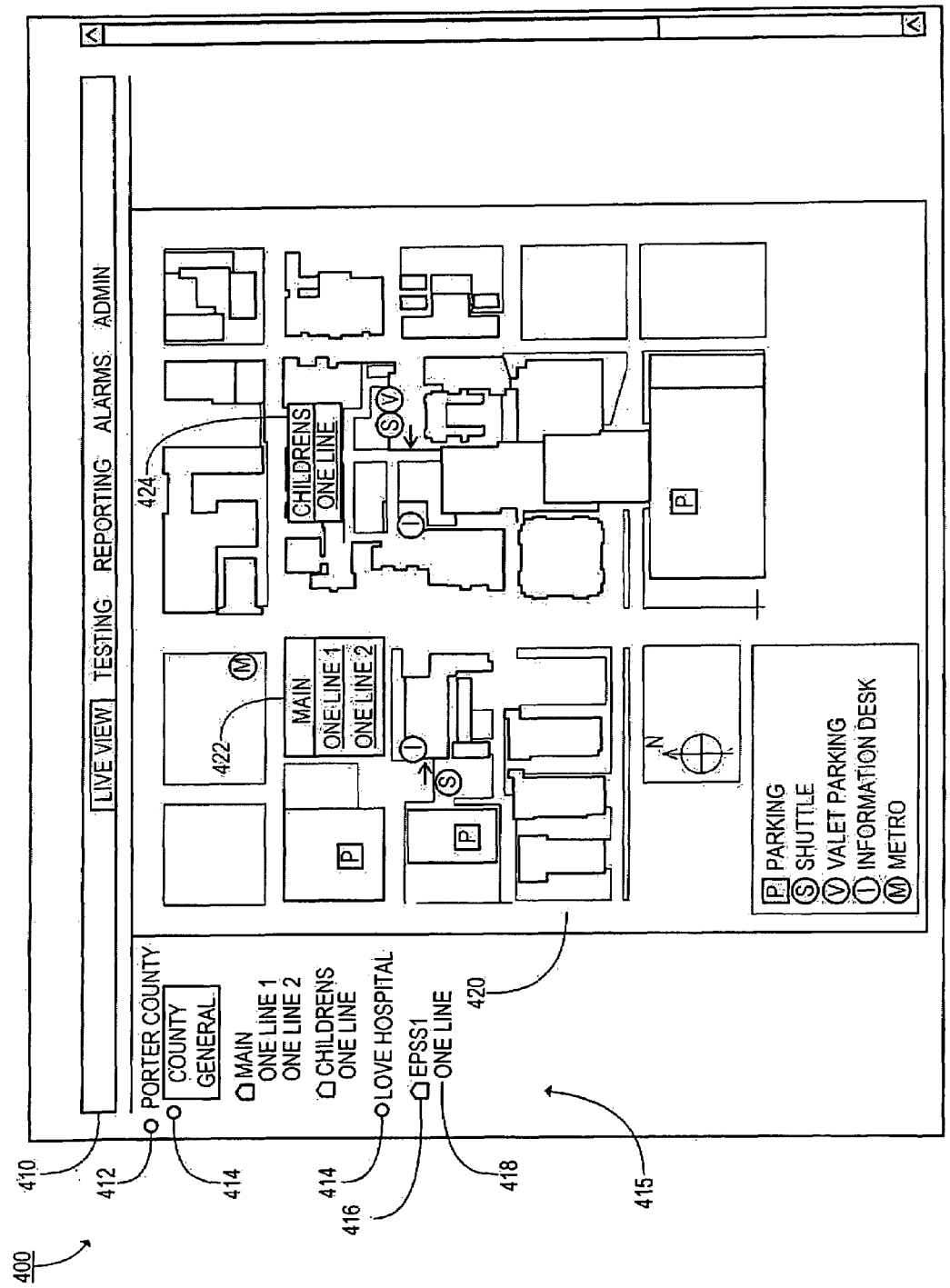
FIG. 6 is an example screen in the "live view" interface of a fifth embodiment.

Turning to FIG. 5, system 300 comprises user interface layer 310, service layer 320, and data layer 350. In many respects, implementations described in relation to software system 202 may also be applied to software system 300, though in some embodiments it is particularly adapted to operate as a meta-server in the system configuration shown in FIG. 3. In this embodiment, user interface layer 310 includes ASP.NET client 312 for presentation of information to users and capture of user input, and OPC web controls 314 for providing an interface between the data provided through OPC client 332 and the presentation layer of ASP.NET client 312. Webcam interface 316 collects and processes data from one or more cameras 195 (see FIG. 1) for presentation through ASP.NET client 312. The three components of user interface layer 310 share security identity 318 in their interaction with other components of software system 300.

Service layer 320 comprises configuration loader/sequencer 328, OPC client 332, logger 338, and alarm manager 342. Logger 338 and alarm manager 342 operate similarly to the corresponding elements 238 and 242, respectively, of FIG. 4, though they have access to and process data from multiple sites 100 and systems 201. Because they have access to more complete sets of data, they can provide a more complete picture of the activities in system 200 including, for example, the effects of a regional power outage on a multi-site institution or the status and results of multi-site testing (organized through this system or otherwise). Alarm manager 342 can be configured to take one or more alarm actions based on data from any site 201 in system 200, or even based on data from multiple sites that is captured substantially simultaneously or over time.

OPC client 332 connects to servers 105 in systems 100 at each site system 201 to collect data from those systems. Configuration loader/sequencer 328 manages electronic files in file storage 352. Configuration loader/sequencer 328, in one example, loads from storage 352 a file that describes the hierarchy of devices in network 200, including generators, interfaces, cameras, sensors, ATSs, terminals, servers, and the like as organized into locations, areas, and regions. The file preferably has a human-readable, structured format (such as XML or a variant thereof) for ease in creating, reading, and processing such files. Configuration loader/sequencer 328 also reads from file storage 352 a file that outlines one or more tests that are to be run on the system, as is discussed in more detail herein.

In the embodiment of system 300 illustrated in FIG. 5, each of the components of service layer 320 (configuration loader/sequencer 328, OPC client 332, logger 338, and alarm manager 342) has its own security identity 330, 336, 340, and 344, respectively, for secure interactions with user interface layer 310 through its security identity 318. This approach has the advantage of fairly granular control over (and logging of) access to data by the components of service layer 320. In alternative embodiments, a common security identity for those components makes authentication and local inter-process communication more simple, while making granular access control more challenging.

Data layer 350 includes files storage 352 and database 356 for storing and providing access to configuration and data in system 300. Each of these components may have one or more subcomponents as discussed above in relation to file storage 252 and database 256. In various embodiments file storage 252 and 352 use the same hardware and storage strategy, while in other embodiments the storage approaches are different. Likewise, database 256 and database 356 may have the same or different characteristics, hardware, software, and topology.

In normal operation, servers 105 and 210 (see FIGS. 1 and 3, respectively) provide access via data networks 115 and 215, respectively, to a browser-based interface. As described herein, server 105 provides access to data from a particular physical site, while server 210 provides access to data from multiple sites. In either case, the present embodiment uses a tab-like bar 410 to provide access to users to sections of the interface such as a "Live View" of the system; "Testing" configuration, status, and resources; "Reporting" of stored data; "Alarms" configuration and history; and "Administration" ("Admin") of the system.

In a "Live View," all or part of a hierarchy 415 organizes generator resources. In this embodiment, a region 412 has one or more areas 414, and each area 414 has one or more locations 416, which in turn are each associated with one or more entities 418. At each level in hierarchy 415, the interface provides a background image with customizable indicators that show the positions of elements in the next level.

In various embodiments, the background image is a map (political, topographical, or other kind), a schematic, a one-line drawing, or another image uploaded by an administrator or user. Using configuration file(s) or an administrative interface, one is able to select a background image for each level and/or item in hierarchy 415, and to place on each image selected overlay text, icons, or other images that indicate the relative position of resources on the next lower level in the hierarchy within the displayed branch or element. In some levels of the display in some embodiments, the graphic and/or text that is displayed to indicate the position of the lower-level branch or element is adapted in color, shape, or content to show the status of that item. For example, text, dots, or borders around text or icons might be green when the unit is operating normally, yellow if alarms have been triggered, red if utility power is not available, and blue if a test is running at a given site or on a given device. Of course, other color schemes, icons, or indicators for use in this system will occur to those skilled in the art.

In various embodiments, background image 420 is established by a system designer, uploaded by an administrator, selected by a user, or otherwise exists on server 105/210. A user or system designer places indicators 422 and 424 on background image 420 to illustrate the approximate position of those items on the image (such as location on a map, or circuit-wise position in a schematic diagram). In some embodiments, users can move indicators 422 and 424 by dragging and dropping them into different positions on background image 420. In some embodiments, items below indicators 422 and 424 appear as part of the indicator itself (here, "One-Line 1" and "One-Line 2" appear as part of indicator 422 because they are entity-level items in the hierarchy at the "Main" location. In some embodiments users are presented with the option of changing the font, size, and color of indicator text, and in others users are provided the facility to choose what aspects of status or criteria are indicated by one or more available indication techniques as described above.

In some embodiments, some view levels show live operational data, such as frequency, voltage, uptime, and the like, as part of indicators 422 and 424. The system in this illustrated embodiment maintains a database of common makes and models of equipment and sensors so that when a system is being set up or new equipment is added to the existing system, a system architect can easily add all relevant information for each device by selecting a device model, assigning a text label to the new device, placing it in the hierarchy, and selecting operational parameters and the display mode for real-time data. The database of devices automatically provides the device-specific tags that can be used in a query to retrieve particular parameters (when a pull-type model is used) or to parse messages when a push-model is implemented. The database in this embodiment also provides standard limits for at least some of the device's operational parameters so that users can simply switch alarms "on" and have rational limits instantly in place. Of course, when a device in a system is not in the database, a system architect, administrator, or operator can add the relevant information concerning its available tags and standard operating conditions (or even just those tags and/or data points to be used) to integrate the new device type into the system.

Figure 7:
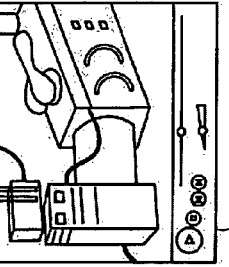
FIG. 7 is an example screen showing device status information according to the fifth embodiment.

FIG. 7 illustrates a entity-level display according to one embodiment. Display 450 includes tab-bar 410 and hierarchy display 415, but the bulk of display 450 is taken up with information specific to a particular entity. Live data section 451 shows the current status and recent event history for the items selected in hierarchical display 415. Current data for the selected device is shown in current data display region 453, images of the selected device (individual captured images or a live video feed) are shown in image display region 455, and an event history for the selected device is shown in event display region 457.

The parameters shown in current data display region 453 may be selected from available data tags for the selected device based on the device tag database described herein by an administrator or user, depending on the needs and preferences of the system designer. Likewise, in some embodiments, the events shown in event display region 457 may include all events generated for the selected device, may include only a particular type of event (such as testing events, startup and shutdown events, and the like), and/or may be filtered by severity or recency of the event, as will be understood by those skilled in the art. In other embodiments no filtering is available.

In the center of display 450 is image display region 455, which is adapted to display for users one or more images of the generator 165 and/or ATS 160 at that site as captured by one or more cameras 195. In various embodiments this image display region 455 shows still images, time-lapse photography, and/or video (real-time or for selected periods). Any or all of these regions 453, 455, 457, in various embodiments, include navigation and interface manipulation features for paging, moving, resizing, filtering, layering, and the like as will also occur to those skilled in the art.

Control/test status display region 461 of the present embodiment displays whether the device is operating or not in display widget 463, as well as whether any tests are active for the entity in the test status display region 465. Alarms relating to the displayed entity are shown in alarm display region 471. This region 471 includes a table 473 of alarm events that shows, for each alarm event, zero or more rows 475, each with the date and time of an alarm event, a text description of the alarm, a type or level of the alarm, and the tag value that triggered the alarm. Other columns in the table may show other information in addition to or instead of this collection of information as will occur to those skilled in the art. Further, alarm display region 471 and/or alarm data table 473 in various embodiments also includes facilities to sort and filter alarm information based on user preference or administrator selection.

A feature of some embodiments of the present system is a facility that enables users to script tests for one or more entities in the system, to schedule or manually initiate those tests, to monitor the tests in progress, and to review the results of the tests. In some embodiments, each test is a sequence of digital assertions to be made to a control device that controls an entity in the power system, paired with an applicable status query that is made to the same control device for verification that the assertion was properly received and is being processed. The system collects parameters identified in the test script for reporting as well as real-time display while the test is in progress. The system provides user interface components that enable users to monitor a test in progress, pause the test, resume the test, or abort the test as necessary or desired based on the data being collected or other factors.

Figure 8:
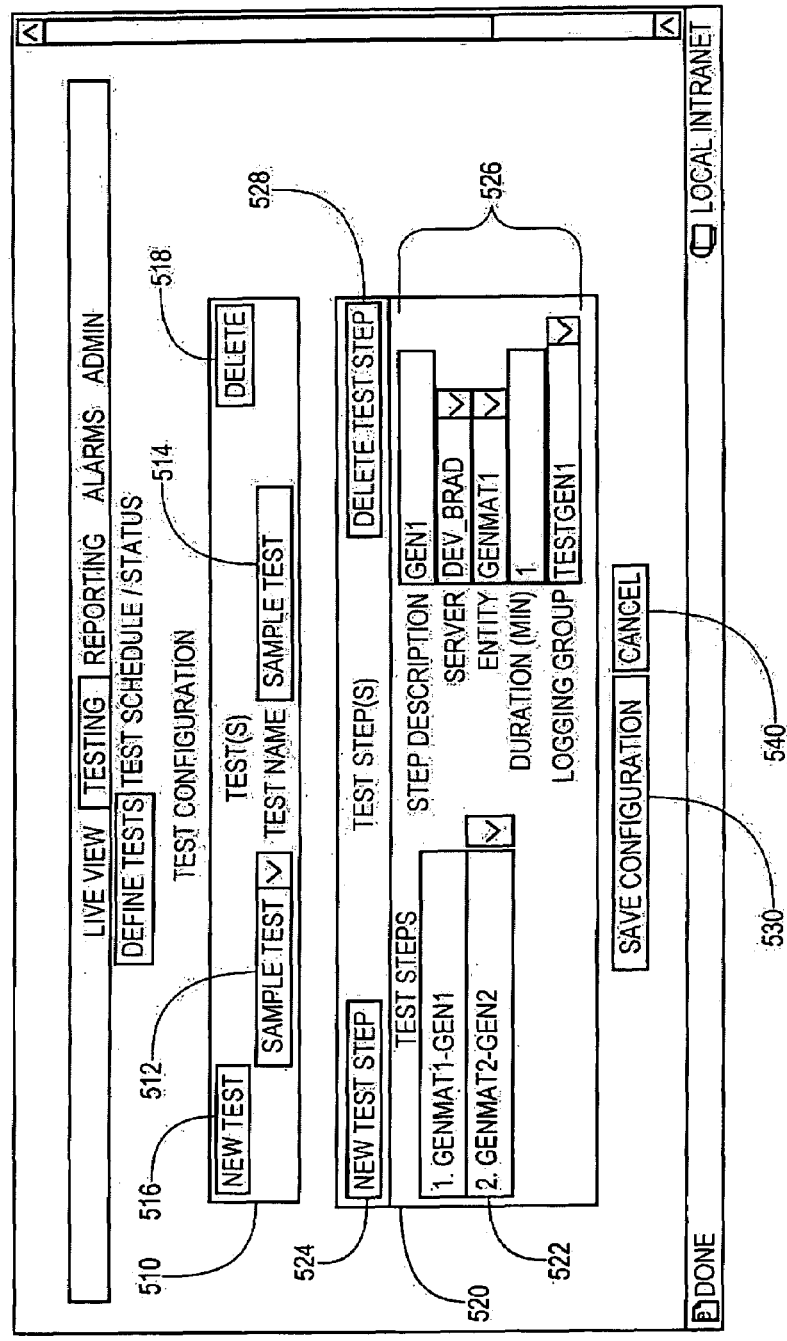
FIG. 8 is an example screen in the test scripting interface of the fifth embodiment.

FIG. 8 illustrates test setup/scripting interface 500, which includes test naming and selection region 510, test sequencing region 520, and Save and Cancel buttons 530 and 540, respectively. Test naming and selection block 510 includes a drop-down list 512 which is populated with named tests that have been created in the system. Users select existing tests with drop-down list 512, change the name of an existing test using test box 514, create a new test with button 516, an delete an existing test using delete button 518.

Tests are scripted using test scripting interface 520. When a new test is created using New Test button 516, the Test Steps list box 522 is emptied to make a place for display of the scripting steps. The user activates New Test Step button 524 to create a new step in the script, which the user then configures using interface elements 526. Interface elements 526 in this embodiment allow a user to specify a description for the test step, the site server that will execute the step, the entity on which the step is executed, the duration of the step, and the logging group (see further discussion below) that should apply to data captured during the test step. Either when the test is scripted or when it is executed, tag manager 226 (see FIG. 4) is consulted to determine which tag should be asserted to initiate the test. If a user wishes to delete a step, the user selects the step in list box 522, then clicks Delete Test Step button 528. The step is then removed from the internal representation of the test, and the step's entry in Test Steps list box 522 is removed.

When the test is scripted as the user desires, he or she activates Save Configuration button 530, and the test configuration is committed to non-volatile memory. Typically tests will be stored at enterprise server 210 so that test steps for devices at multiple sites can be coordinated. In alternative embodiments, tests or test steps are stored at one or more site servers 105. In either event, operational data about electrical generators 165 and other equipment in subsystems 100 are collected and reported by site servers 105 to enterprise servers 210 for presentation to users, storage in the historical record, and as a factual resource for reporting.

Figure 9:
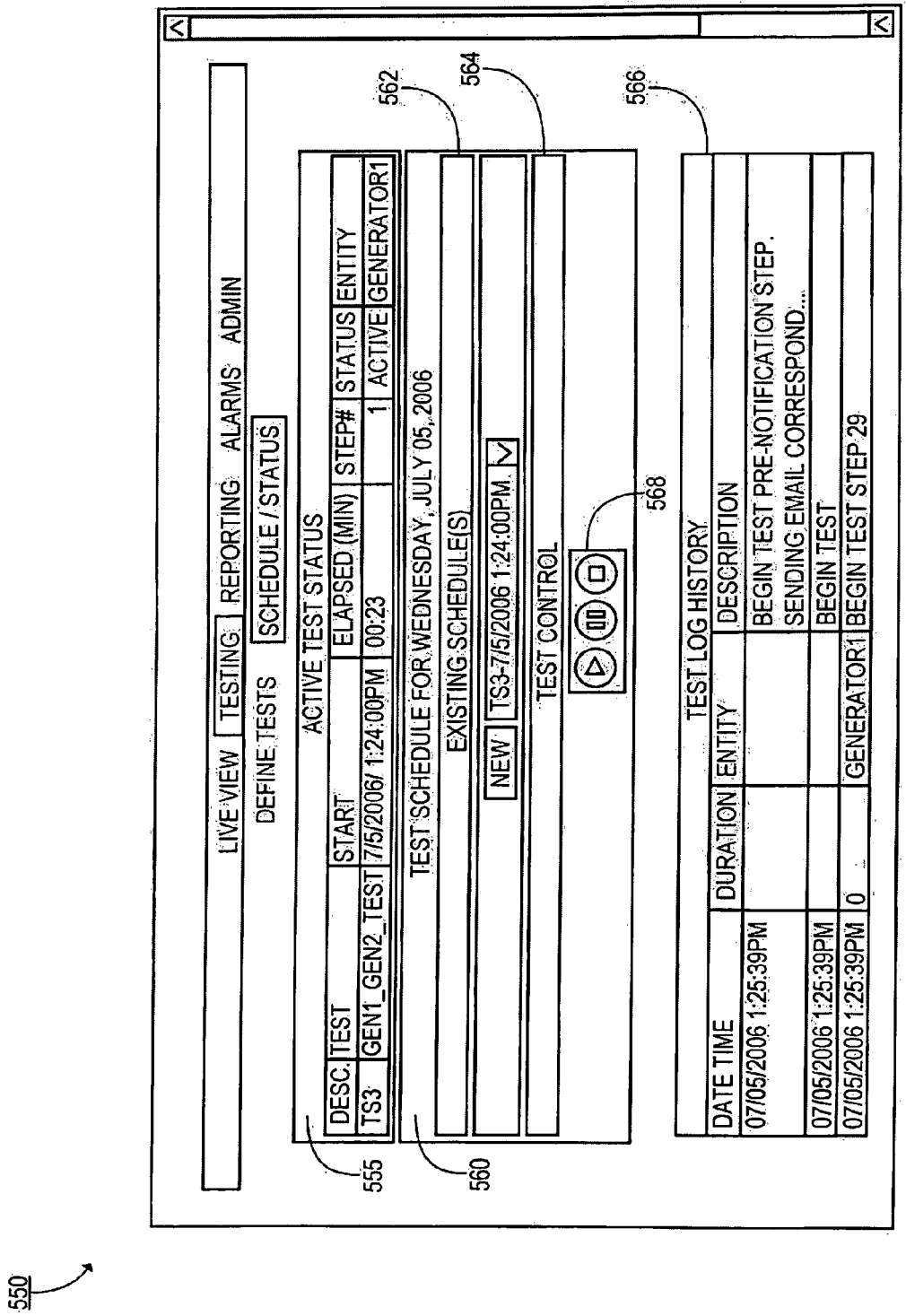
FIG. 9 is an example screen in the test schedule/status interface of the fifth embodiment.

FIG. 9 illustrates test schedule/status interface 550, which includes active test status display region 555 and test schedule display region 560. Active test status display region 555 shows a list of test scripts currently active, including an identifier for the test, a brief description of the test, the date and time at which the test was started, the elapsed time since the test started, the step number within the script that is currently being processed, the execution status of the test (active, paused, aborted, completed, and the like), the entity being tested, and other information additional to or instead of this information as will occur to those skilled in the art. Test schedule display region 560 in this embodiment includes a selector for existing test schedules in existing schedule display element 562, test control widgets 568 in test control display region 564, and a history of tests conducted under the selected schedule in test history region 566. In other embodiments, the display of existing schedules, control facilities for starting, pausing, resuming, and stopping tests, test status displays and histories are separated and/or combined on multiple interface screens, or have alternative display configurations as will occur to those skilled in the art.

One such possible alternative display is shown in FIG. 10. Test schedule calendar display 570 includes active test status list 572, which is analogous to active test status display region 555 in FIG. 9. In addition, calendar display 570 includes test scheduling calendar 574 that shows test names and times in a calendar view for easy evaluation and navigation by users. Weekly and annual calendars may also be displayed as will occur to those skilled in the art. When a test script has been defined (see, for example, the discussion relating to FIG. 8), it can be added to test scheduling calendar 574 using a context menu, pop-up dialog, or the like.

FIG. 11 shows an example test report for an exemplary test in this embodiment. Test report 579 includes a title, an identification of the entity or entities tested, the date and time at which the test was initiated, and data captured during the test. The parameters being captured, as discussed above, may be selected by the test designer or administrator from measurable parameters for that entity (which the system knows based on the entity database described herein). Sample frequencies for captured data in this embodiment are determined when the test is designed, though in some embodiments the sampling frequency and timing are also adjustable on-the-fly, and may vary over time as will occur to those skilled in the art.

Because the data captured (both during normal operation and during testing) is stored in a standard database in this embodiment, report design software may be used to create reports for the system without much difficulty. For example, CRYSTAL REPORTS, published by Business Objects, 3330 Orchard Parkway, San Jose, Calif. 95134, USA, may be used to generate desired human-readable or machine-readable reports as will be understood by those skilled in the art. Alternatively, Microsoft Report Builder may be used to construct reports using these data resources as desired or needed. Report configurations and/or outputs may be stored on a site server 105 or enterprise server 210, or both, or elsewhere as will occur to those skilled in the art.

Figure 12:
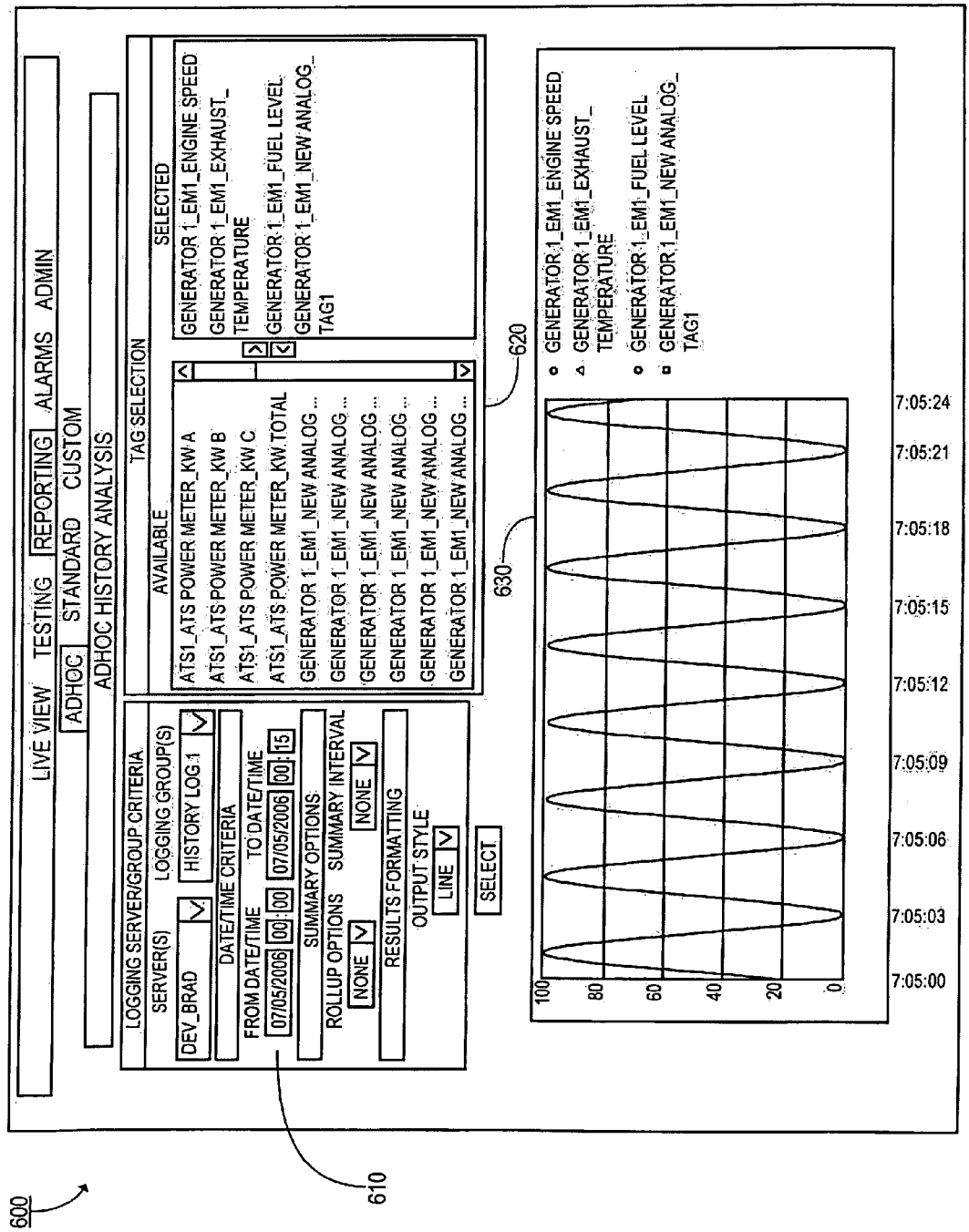
FIG. 12 is an example screen in the reporting interface of the fifth embodiment.

An example reporting/history interface is shown in display 600 in FIG. 12. Display 600 includes display criteria selectors in parameter selection display region 610. In this embodiment, users select the server(s) and logging group(s) to be accessed for data that will be displayed, dates and times defining the range of interest, roll-up and summary options, and output styles and forms for the report or graph. Available tags are listed in and may be selected using tag selection display region 620, and the system provides output with the selected parameters in output display region 630. Many alternative parameter selection techniques and output techniques are used in various embodiments as will occur to those skilled in the art.

Figure 14:
FIG. 14 is an example screen in the alarm history interface of the fifth embodiment.

Alarm management interface 650 is shown in FIG. 13. This interface 650 is updated in real time using AJAX or other display/interface techniques that will occur to those skilled in the art. The alarm interface 650 in this embodiment shows the dates and times of recent alarms, text associated with the alarms, the tags and limits that triggered the alarms, as well as the alarm types and the tag values when the alarms were triggered. This data is displayed in table 655, which in some embodiments the user can manipulate to sort and filter as desired. One such interface is shown in FIG. 14 as display 660. Display 660 includes selection and filter display region 662 and data/navigation display region 665, though other arrangements and interface techniques will occur to those skilled in the art.

Figure 15:
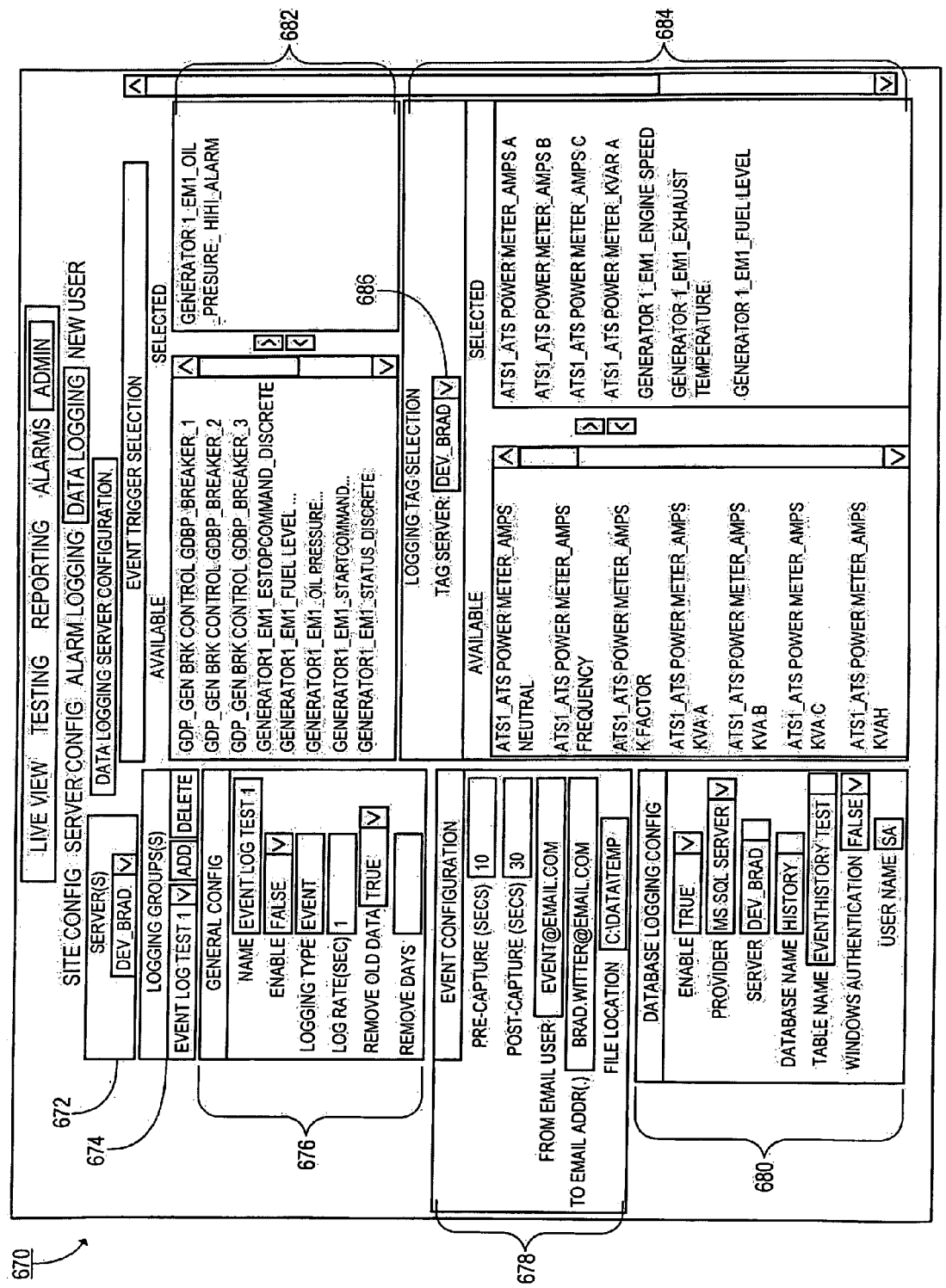
FIG. 15 is an example screen in the logging group configuration interface of the fifth embodiment.

FIG. 15 illustrates a data logging configuration interface 670 in this fifth embodiment. A server in the system is selected in server selection region 672, and a "logging group" is selected or created in logging group selection region 674. The logging group is named and enabled in general configuration region 676, which also can be used to determine the logging type, set the sample rate, and select whether to automatically remove data beyond a certain age.

For event-type logging groups, the window of time in which data is captured and saved before and after the event, as well as the parameters for reporting the event are selected in event configuration display region 678. The example display 670 shows parameters for reporting in an email and/or saving in a data file when the event is triggered, though other reporting techniques may easily be used without undue experimentation by those skilled in the art.

Database logging for the logging group is configured in database logging display region 680. In this interface section the user can enable or disable database logging, provide the connector provider, server, database and table names, and other configuration information for establishment of database connections, and enter other parameters as will occur to those skilled in the art.

Event triggers for the logging group are selected using event trigger display region 682, which provides a list of available event triggers and a facility for the user to select one or more of them to trigger events for the logging group. Likewise, tags to be included in the log (event, database, or otherwise) for the logging group are selected in logging tag selection region 684. The user can select a different server from which tags to be selected with selection widget 686, though other selection techniques may be used as will occur to those skilled in the art. When the parameters for the logging group have been set or modified as desired, a "Submit" or "Commit" button (not shown) may be activated, and the updated configuration is stored in the system.

In alternative embodiments, different software architectures may be used, such as different layering delineations, object encapsulations, and security identity groupings. In some alternatives, processes shown in this disclosure as a single software system (such as FIG. 4 or FIG. 5) are distributed among multiple processors in a homogeneous or heterogeneous distributed system.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An electrical generator monitoring system, comprising:
 a plurality of sensors that detect operational parameters of a plurality of electrical generators at a plurality of physical locations;
 a computing device; and
 a plurality of communication devices, where each communication device:
  has a communication status that reflects whether the communication device is or is not in effective communication with the computing device at a given time;
  is in communication with one or more of the sensors to receive information about the operational parameters detected by those one or more sensors; and
  makes data characterizing the received information available to the computing device;
 wherein the computing device produces a unified display that simultaneously shows the communication status of the plurality of communication devices.

2. The system of claim 1, wherein the unified display also shows at least a portion of the information received by the plurality of communication devices.

3. An electrical generator monitoring system, comprising:
 a plurality of site servers, each site server:
  communicating with one or more electrical generators to collect data representing one or more operational parameters from each generator; and
  aggregating the data by taking one or more of the actions in a first action group consisting of:
   filtering the data;
   calculating a maximum for at least one of the operational parameters of at least one generator over a period of time;
   calculating a minimum for at least one of the operational parameters of at least one generator over a period of time;
   detecting that one or more of the operational parameters of at least one generator has exceeded a limit; and
   making the data available via a data network for access by remote individuals; and
 an enterprise server, the enterprise server:
  communicating with each of the plurality of site servers to retrieve at least a portion of the data collected by each; and
  processing the retrieved data by applying one or more actions in the first action group to the retrieved data.

4. The system of claim 3, wherein at least one of the site servers:
 stores configuration information about a logging group; and
 records events as a function of the configuration information for the logging group.

5. The system of claim 4, wherein the configuration information about the logging group is maintained on the enterprise server.

6. The. system of claim 4, wherein the aggregating comprises making the data available for access by remote individuals using a web browser.

7. The system of claim 4, wherein the aggregating comprises making the data available for access by sending an e-mail message to one or more addresses.

* * * * *